(12) United States Patent
Ujikawa et al.

(10) Patent No.: US 10,958,349 B2
(45) Date of Patent: Mar. 23, 2021

(54) VIRTUAL SUBSCRIBER LINE TERMINAL STATION DEVICE AND CONTROL METHOD FOR VIRTUAL SUBSCRIBER LINE TERMINAL STATION DEVICE

(71) Applicant: NIPPON TELEGRAPH AND TELEPHONE CORPORATION, Tokyo (JP)

(72) Inventors: Hirotaka Ujikawa, Yokosuka (JP); Noriyuki Oota, Yokosuka (JP); Kota Asaka, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/631,513

(22) PCT Filed: Jul. 19, 2018

(86) PCT No.: PCT/JP2018/027079
§ 371 (c)(1),
(2) Date: Jan. 16, 2020

(87) PCT Pub. No.: WO2019/017427
PCT Pub. Date: Jan. 24, 2019

(65) Prior Publication Data
US 2020/0177280 A1 Jun. 4, 2020

(30) Foreign Application Priority Data
Jul. 19, 2017 (JP) .............................. JP2017-140266

(51) Int. Cl.
*H04B 10/27* (2013.01)
*H04L 12/911* (2013.01)

(52) U.S. Cl.
CPC ............. *H04B 10/27* (2013.01); *H04L 47/82* (2013.01)

(58) Field of Classification Search
None
See application file for complete search history.

(56) References Cited

U.S. PATENT DOCUMENTS

| | | | | |
|---|---|---|---|---|
| 2007/0110099 A1* | 5/2007 | Ozaki | ................... | H04B 10/27 370/468 |
| 2009/0190606 A1 | 7/2009 | Lee et al. | | |
| 2010/0129072 A1* | 5/2010 | Yoshiuchi | .......... | H04B 10/6911 398/17 |

FOREIGN PATENT DOCUMENTS

| | | |
|---|---|---|
| JP | 2007142764 A | 6/2007 |
| JP | 2007304845 A | 11/2007 |

OTHER PUBLICATIONS

NTT, Introducing the New FASA Concept for Future Access Systems—With access equipment modularization, NTT enables service providers to begin service immediately—Feb. 8, 2016 Internet <http://www.ntt.co.jp/news2016/1602/160208a.html>.

(Continued)

*Primary Examiner* — David W Lambert
(74) *Attorney, Agent, or Firm* — Harness, Dickey & Pierce, P.L.C.

(57) ABSTRACT

A virtual subscriber line terminal station device includes a software component including software to be added in accordance with a service requirement; and hardware having general-purpose functions; wherein the hardware includes a communication unit that receives a bandwidth allocation request transmitted by a subscriber line termination device; and the software component includes a bandwidth allocation component. The bandwidth allocation component has an individual unit that, based on an algorithm for allocating bands, computes a bandwidth to be allocated to the sub- (Continued)

scriber line termination device that transmitted the bandwidth allocation request; a common unit that, in accordance with the bandwidth allocated by the individual unit, allocates the bandwidth to the subscriber line termination device; and an interface between the individual unit and the common unit. The common unit converts the bandwidth allocation request received by the communication unit to a format that can be used by the individual unit. The individual unit computes the bandwidth to be allocated to the subscriber line termination device that transmitted the bandwidth allocation request that is converted, by the common unit, to a format that can be used by the individual unit.

10 Claims, 7 Drawing Sheets

(56) References Cited

OTHER PUBLICATIONS

Masashi Tadokoro et al., "Virtualization technology for optical access network", IEICE Technical Report, vol. 115, No. 123, pp. 85-89, 2015.
International Search Report regarding PCT/JP2018/027079, dated Oct. 9, 2018; ISA/JP.

* cited by examiner

VIRTUAL SUBSCRIBER LINE TERMINAL STATION DEVICE AND CONTROL METHOD FOR VIRTUAL SUBSCRIBER LINE TERMINAL STATION DEVICE

CROSS-REFERENCE TO RELATED APPLICATIONS

This application is a 371 U.S. National Phase of International Application No. PCT/JP2018/027079, filed on Jul. 19, 2018, which claims priority to Japanese Application No. 2017-140266, filed Jul. 19, 2017. The entire disclosures of the above applications are incorporated herein by reference.

TECHNICAL FIELD

The present invention relates to a virtual subscriber line terminal station device and a control method for a virtual subscriber line terminal station device.

BACKGROUND ART

A PON (Passive Optical Network), which is access system equipment, is constituted by a subscriber line terminal station device (OLT: optical line terminal) that is installed in a central office of a communication service provider and subscriber line termination devices (ONU: optical network terminal) that are installed in users' homes. In this case, an OLT is a device for communicating with other communication devices, such as ONUs, by means of optical signals transmitted via an optical communication network. ONUs are devices for communicating with other communication devices by means of optical signals transmitted via a communication network. ONUs may be formed by using multiple devices. ONUs are installed, for example, in the homes of users to whom communication services are provided.

In a PON system (see, for example, Non-Patent Document 1), the light of a downlink signal, which is a signal from an OLT to ONUs, is split by a splitter, so the same optical signal reaches all of the ONUs. As a result thereof, the downlink signals are transmitted to all of the ONUs as a broadcast. Each ONU receives the signals and selects whether to accept or discard received frames by extracting frames from the arriving downlink signals and determining whether or not the frames are addressed thereto. In a PON, identifiers known as LLIDs (Logical Link IDs) are used for this determination. The value of an LLID is determined in the OLT at the time of ONU registration. Additionally, the values of the LLIDs are managed so that LLIDs are not duplicated between ONUs subordinate to a PON interface.

An LLID is contained in the preamble of a frame defined under the IEEE 802.3ah standard. In downlink communications, an OLT determines which ONU each transmission frame is to be transmitted to, inserts the LLID of that ONU into the preamble of the transmission frame, and sends the frame to the ONUs. The ONUs collate the LLIDs in the received frames with their own LLIDs of which they have been notified beforehand by the OLT. If there is a match, an ONU determines that the frame is addressed thereto and accepts the received frame. If not, the ONU concludes that the frame is not addressed thereto and discards the received frame. In uplink communications, which are communications from an ONU towards an OLT, the ONU inserts the LLID allocated thereto into the preamble of a transmission frame and transmits the frame to the OLT. In the OLT, it is determined which ONU transmitted a received frame by means of the LLID contained in the preamble of the received frame.

In PONs, efforts are currently being made towards virtualization, such as network function virtualization (NFV), for expediting the introduction of services. The concept of NFV involves using software to implement communication device functions (hereinafter referred to as "NW functions") that have conventionally been implemented by means of dedicated hardware, and having said NW functions operate on an operating system using general-purpose hardware. Since NFV allows NW functions to be added or modified by merely updating software, the time from development to introduction and deployment of services is reduced. Due to such properties, the virtualization of PON systems has garnered interest for use in optical access systems.

CITATION LIST

Non-Patent Literature

[Non-Patent Document 1]
NTT, "Introducing the New FASA Concept for Future Access Systems—With access equipment modularization, NTT enables service providers to begin service immediately", internet <http://www.ntt.co.jp/news2016/1602/160208a.html>

SUMMARY OF THE INVENTION

Problems to be Solved by the Invention

Since conventional hardware-based OLTs need a whole new device when a function change of a central office is required or the like, they are uneconomical from the viewpoint of equipment efficiency and the like, and hinder the flexible provision of services. Thus, the possibility of virtualizing OLTs is being investigated. By virtualizing OLTs, the functions of OLTs can be implemented by means of software.

By implementing the functions of OLTs by means of software, service deployment can be expected to be accelerated.

On the other hand, the below-indicated problem arises in comparison to the conventional case in which each manufacturer produces an OLT as a single unit. Since a virtual OLT device is a new device, it becomes possible to compose the OLT by combining functions provided by various vendors, which are specific to virtualization. However one of the functions in virtual OLT devices in virtual OLT devices is changed, the bandwidth allocation is performed under different timing control or the like compared to before without the change. And the difference of timing according to the change depends on what function is changed or the like. For this reason, when a REPORT signal or the like is transmitted from each ONU, there is fluctuation, which is characteristic of software, in the frame processing time in functional units implemented by software on a virtual OLT device. For example, there are disparities in the frame processing time depending on the timing of the processes, a CPU load state at the time of execution, and the like. For this reason, the frame processing time does not remain constant, and the processing time is long for some frames.

Additionally, a virtual OLT device computes a bandwidth by means of a bandwidth allocation algorithm, and thereafter generates a GATE signal to be transmitted to each ONU at the stage during which bandwidth allocation is actually performed. In this case, a fluctuation occurs in the transmission timing intervals between GATE signals transmitted to each ONU. As a result thereof, the transmission timing of the GATE signals is not fixed, and the transmission timing of some GATE signals is delayed.

For these reasons, there is a problem in that delay reduction, which is the most important technical demand in virtual OLT devices, is hindered. In the future, a virtual OLT device in which a DBA (Dynamic Bandwidth Allocation) application is installed as a software component for ensuring compatibility, thereby maintaining low delay times, will be desired.

In view of the above-mentioned circumstances, the present invention has an objective of providing a virtual subscriber line terminal station device that is able to ensure compatibility of bandwidth allocation components for allocating bands to subscriber line termination devices.

Means for Solving the Problems

According to one aspect of the present invention is a virtual subscriber line terminal station device including a software component including software to be added in accordance with a service requirement; and hardware having general-purpose functions. The hardware includes a communication unit that receives a bandwidth allocation request transmitted by a subscriber line termination device, the software component includes a bandwidth allocation component that allocates a bandwidth to the subscriber line termination device based on the bandwidth allocation request received by the communication unit, the bandwidth allocation component includes an individual unit that, based on an algorithm for allocating bands, computes a bandwidth to be allocated to the subscriber line termination device that transmitted the bandwidth allocation request; a common unit that, in accordance with the bandwidth allocated by the individual unit, allocates the bandwidth to the subscriber line termination device; and an interface between the individual unit and the common unit, the common unit converts the bandwidth allocation request received by the communication unit to a format that can be used by the individual unit, the individual unit computes the bandwidth to be allocated to the subscriber line termination device that transmitted the bandwidth allocation request that is converted, by the common unit, to a format that can be used by the individual unit.

According to one aspect of the present invention is the above-mentioned virtual subscriber line terminal station device, wherein the common unit outputs the data received by the communication unit to the interface, the interface outputs the data output by the common unit to the individual unit.

According to one aspect of the present invention is the above-mentioned virtual subscriber line terminal station device, wherein the individual unit replaces the algorithm with another algorithm for allocating bands, the common unit includes a holding unit that holds the bandwidth allocation request acquired by the common unit while a process for replacement with the other algorithm is being performed, wherein the holding unit outputs the held bandwidth allocation request to the individual unit when the ending of the process for replacement is detected.

According to one aspect of the present invention is the above-mentioned virtual subscriber line terminal station device, wherein the individual unit further includes a detection unit that detects that the process for replacement of the other algorithm has ended, wherein the holding unit outputs the bandwidth allocation request to the individual unit when the ending of the process for replacement is detected by the detection unit.

According to one aspect of the present invention is the above-mentioned virtual subscriber line terminal station device, wherein the holding unit holds data acquired by the common unit while the process for replacement with the other algorithm is being performed, and outputs the data in addition to the bandwidth allocation request to the individual unit when the ending of the process for the replacement is detected by the detection unit.

According to one aspect of the present invention is the above-mentioned virtual subscriber line terminal station device, wherein the common unit further comprises a bandwidth allocation unit that allocates the bandwidth to the subscriber line termination device while the process for replacement with the other algorithm is being performed.

According to another aspect of the present invention is a control method for a virtual subscriber line terminal station device comprising a software component including software to be added in accordance with a service requirement; and hardware having general-purpose functions, wherein the control method includes: receiving, by the hardware, a bandwidth allocation request transmitted by a subscriber line termination device; converting, by a common unit in the software component, the bandwidth allocation request received by the hardware to a format that can be used by an individual unit in the software component; computing, by the individual unit in the software component, based on an algorithm for allocating bands, a bandwidth to be allocated to the subscriber line termination device that transmitted the converted bandwidth allocation request; and allocating, by the common unit in the software component, in accordance with the bandwidth allocated by the individual unit, the bandwidth to the subscriber line termination device.

Effects of the Invention

According to the present invention, it is possible to provide a virtual subscriber line terminal station device that is able to ensure compatibility of bandwidth allocation components for allocating bands to subscriber line termination devices.

EMBODIMENTS FOR CARRYING OUT THE INVENTION

Embodiments of the present invention will be explained with reference to the drawings. The embodiments explained below are merely examples, and the embodiments to which the present invention can be applied are not limited to the embodiments below.

In all of the drawings for explaining the embodiments, the same reference symbols are used to refer to elements having the same functions, and redundant descriptions will be omitted.

First Embodiment

Figure 1:
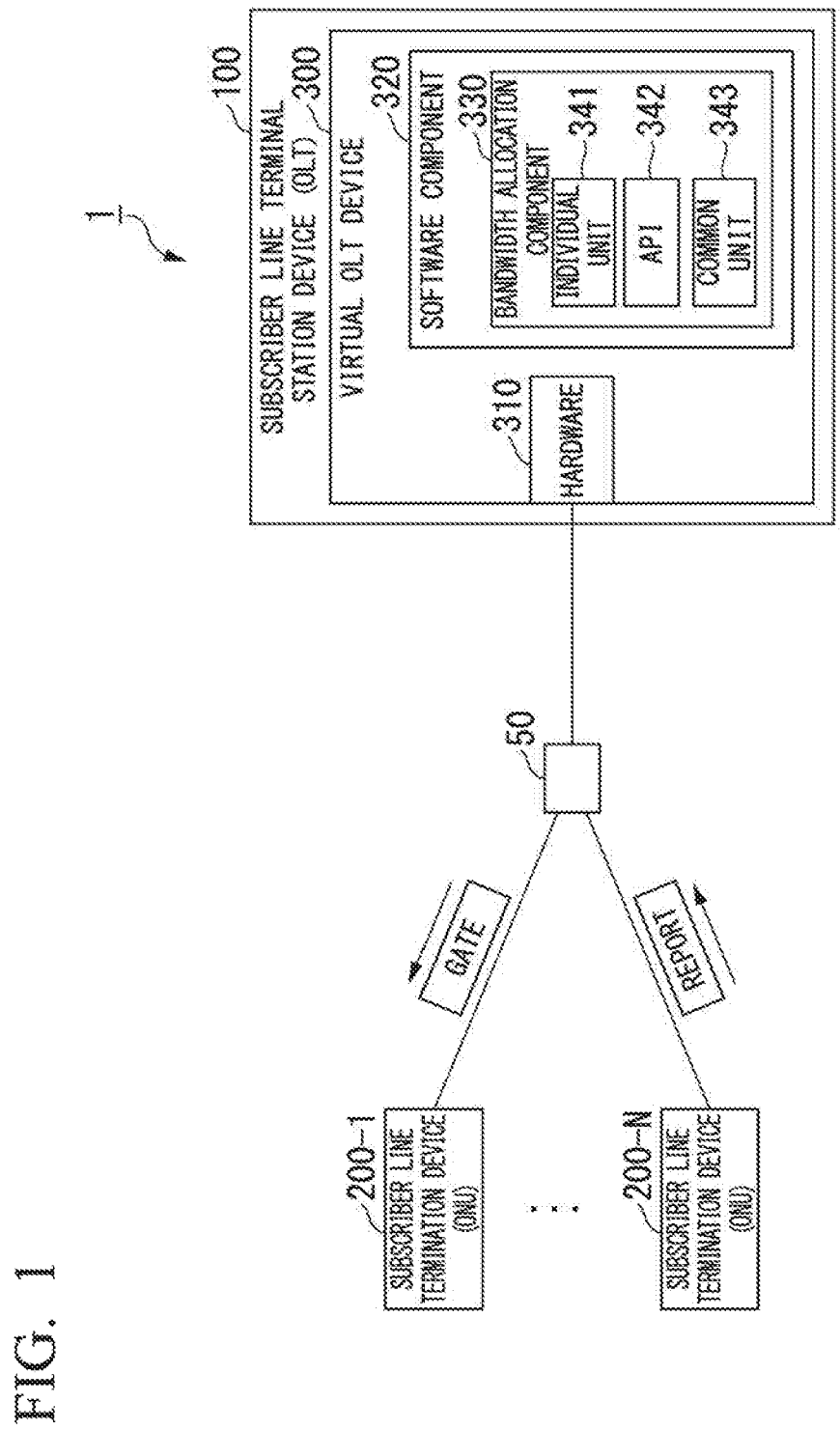
FIG. 1 is a diagram illustrating an example (1) of an optical communication system according to a first embodiment.

FIG. 1 is a diagram illustrating an example (1) of an optical communication system according to the first embodiment. The optical communication system 1 is a system for communicating by using optical signals. An example of the optical communication system 1 is a PON system, which comprises an OLT 100 and an ONU 200-1, ..., an ONU 200-N (where N is an integer such that N>0). Hereinafter, an arbitrary ONU among the ONU 200-1, ..., ONU 200-N will be referred to as the ONU 200. The ONU 200 is connected to the OLT 100 via optical transmission paths including an optical fiber FB and an optical splitter SP 50.

The OLT 100, by means of a GATE frame, provides instructions regarding transmission starting times and transmission amounts so as to allow each of the ONU 200-1 to the ONU 200-N to transmit signals without colliding in time. Meanwhile, the ONU 200, by means of a REPORT frame, notifies the OLT 100 of the amount of data that has accumulated in a buffer in the ONU 200 and that is awaiting transmission.

Specifically, when the ONU 200 receives uplink data, the received uplink data is accumulated in a buffer. The ONU 200 includes information indicating the amount of uplink data that has accumulated in a REPORT frame, and transmits the REPORT frame to the OLT 100.

The OLT 100 receives the REPORT frame transmitted by the ONU 200 and acquires the information indicating the amount of uplink data contained in the received REPORT frame. The OLT 100 derives an uplink bandwidth that is to be allocated to the ONU 200 based on the acquired information indicating the amount of uplink data and the bands being used by other ONUs 200. Specifically, the OLT 100 derives the uplink transmission starting time and the amount to be transmitted by the ONU 200. The OLT 200 includes information indicating the derived uplink bandwidth in a GATE frame, and transmits the GATE frame including the information indicating the uplink bandwidth to the ONU 200.

The ONU 200 receives the GATE frame transmitted by the OLT 100 and transmits the uplink data on the basis of the information indicating the uplink bandwidth contained in the received GATE frame. The ONU 200 may notify the OLT 100 of information indicating the amount of uplink data that has accumulated in the buffer for the next bandwidth allocation.

(OLT)

As illustrated in FIG. 1, the OLT 100 comprises a virtual OLT device 300, and the virtual OLT device 300 comprises hardware 310 and a software component 320. The software component 320 comprises a bandwidth allocation component 330, and the bandwidth allocation component 330 comprises an individual unit 341, an API (Application Programming Interface) 342 and a common unit 343.

The hardware 310 has general-purpose functions. Specifically, the hardware 310 includes a communication unit that receives bandwidth allocation requests transmitted by the ONU 200, and that outputs the received bandwidth allocation requests to the software component 320.

The software component 320 includes software that is added and updated in accordance with service requirements. In the present embodiment, the explanation will be continued using the case in which a bandwidth allocation component 330 for allocating bands to the ONU 200 has been added, as an example of software.

The bandwidth allocation component 330 allocates bands to the ONU 200 on the basis of the bandwidth allocation requests transmitted by the ONU 200.

The individual unit 341, based on an algorithm for allocating bands, acquires a bandwidth that is to be allocated to the ONU 200 that transmitted the bandwidth allocation request. The individual unit 341 has an algorithm that is isolated from the common behavior of time-critical functions, and that allocates bands to the respective ONUs 200. Time-critical functions are, for example, functions having processing time requirements. The common behavior of time-critical functions includes, for example, common processes that are performed in common, regardless of the content of the algorithm for allocating bands. For example, the common unit 343 performs common processes that are performed in common, regardless of the content of the algorithm, and the individual unit 341 performs processes other than the common processes. Specifically, the individual unit 341 performs processes for allocating bands to the respective ONUs 200 in accordance with the algorithm.

The individual unit 341 acquires the bandwidth allocation request output by a common unit 343 to be described below, and based on the acquired bandwidth allocation request, computes a bandwidth to be allocated to the ONU 200 that transmitted the allocation request. The individual unit 341 outputs information indicating the computed bandwidth that is to be allocated to the ONU 200, through the API 342 to the common unit 343.

The API 342 is an interface between the individual unit 341 and the common unit 343. In other words, the API 342 is an interface that is used by the individual unit 341 and the common unit 343 in order to exchange information.

The common unit 343 acquires the bandwidth allocation request output by the communication unit and message-converts the acquired bandwidth allocation request to a message format that is used by the individual unit 341. The common unit 343 outputs the message-converted bandwidth allocation request, through the API 342 to the individual unit 341.

Additionally, the common unit 343 acquires the information indicating the bandwidth that is to be allocated to the ONU 200 output by the individual unit 341 and decodes the acquired information indicating the bandwidth that is to be allocated to the ONU 200. The common unit 343 message-converts the decoded information indicating the bandwidth that is to be allocated to the ONU 200 to a message format that is used by the hardware 310. The common unit 343 outputs, to the communication unit, the message-converted information indicating the bandwidth that is to be allocated to the ONU 200.

One example of an OLT 100 comprises a CPU (Central Processing Unit), memory, auxiliary storage devices and the like that are connected by a bus, and functions as a device comprising a bandwidth allocation component 330 by executing a bandwidth allocation program. All or some of the functions of the bandwidth allocation component 330 may be realized by using hardware such as an ASIC (Application Specific Integrated Circuit), a PLD (Programmable Logic Device) or an FPGA (Field Programmable Gate Array). The bandwidth allocation program may be recorded in a computer-readable recording medium. A computer-readable recording medium is, for example, a portable medium such as a flexible disk, a magneto-optic disk, a ROM or a CD-ROM, or a storage device such as an internal hard disk in a computer system. The bandwidth allocation program may also be transmitted via an electrical communication line.

Figure 2:
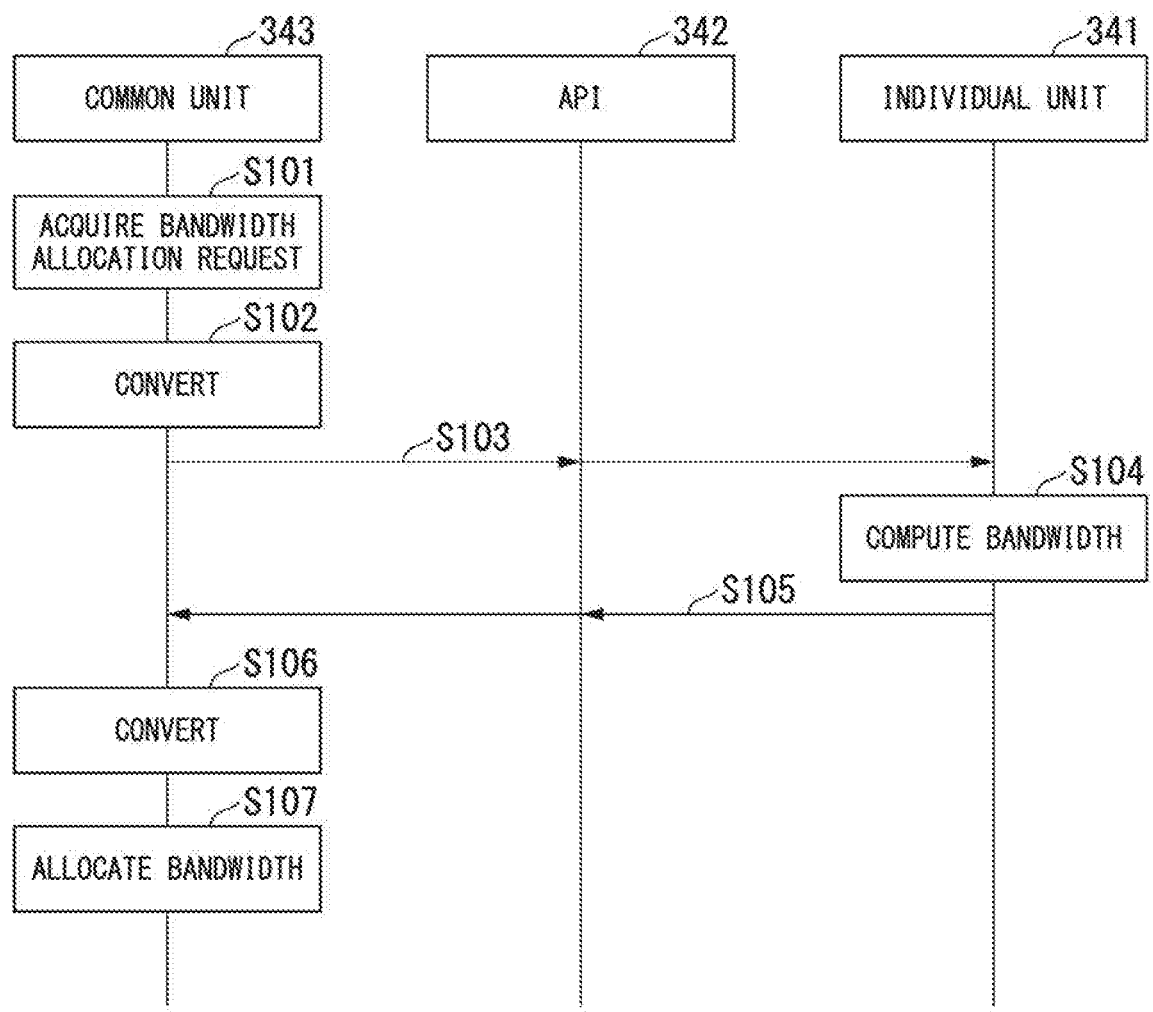
FIG. 2 is a diagram showing an example of the processing flow in the optical communication system according to the first embodiment.

FIG. 2 is a diagram showing an example of the processing flow in the optical communication system according to the first embodiment. As mentioned above, the ONU 200 transmits a REPORT frame to the OLT 100.

The common unit 343 acquires a bandwidth allocation request (REPORT frame) output by the communication unit (S101). The common unit 343 message-converts the acquired bandwidth allocation request to a message format that is used by the individual unit 341 (S102). The common unit 343 outputs the message-converted bandwidth allocation request through the API 342 to the individual unit 341 (S103).

The individual unit 341 acquires the bandwidth allocation request output by the common unit 343. The individual unit 341 computes a bandwidth to be allocated to the ONU 200 that transmitted the allocation request on the basis of the acquired bandwidth allocation request (S104). The individual unit 341 computes the bandwidth (information indicating an uplink band) based on information indicating the amount of uplink data contained in the REPORT frame and the bands used by the other ONUs 200. The individual unit 341 outputs information indicating the computed bandwidth to be allocated to the ONU 200, through the API 342 to the common unit 343 (S105).

The common unit 343 acquires the information indicating the bandwidth to be allocated to the ONU 200 output by the individual unit 341. The common unit 343 decodes the acquired information indicating the bandwidth to be allocated to the ONU 200. The common unit 343 message-converts the decoded information indicating the bandwidth to be allocated to the ONU 200 to a message format used by the hardware 310 (S106). The common unit 343 allocates a bandwidth to the ONU 200 in accordance with the bandwidth allocated by the individual unit 341 (S107). Specifically, the common unit 343 outputs, to the communication unit, message-converted information (GATE frame) indicating the bandwidth allocated to the ONU 200. The communication unit transmits the GATE frame to the ONU 200.

As a result thereof, the ONU 200 receives the GATE frame transmitted by the OLT 100. The ONU 200 transmits uplink data on the basis of the information indicating the uplink bandwidth contained in the received GATE frame.

Figure 3:
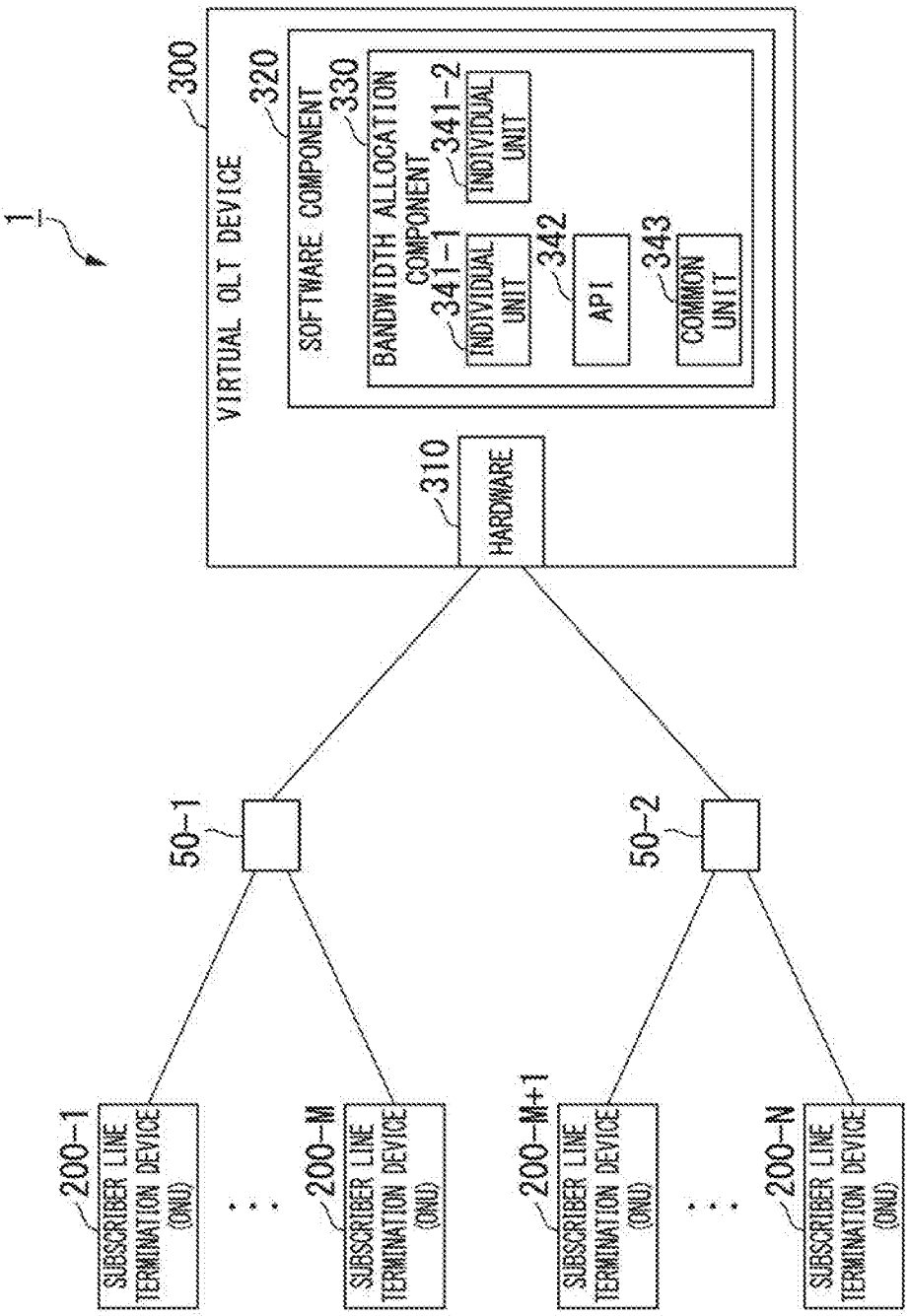
FIG. 3 is a diagram illustrating an example (2) of an optical communication system according to the first embodiment.

FIG. 3 is a diagram illustrating an example (2) of an optical communication system according to the first embodiment. In the example illustrated in FIG. 3, the optical communication system comprises a plurality of PONs. In FIG. 3, the OLT is omitted.

One example of the optical communication system 1 comprises a virtual OLT device 300, and an ONU 200-1, . . . , an ONU 200-M, an ONU 200-M+1, an ONU 200-N (where M and N are integers such that M, N>0 and M<N).

The ONU 200-1, . . . , ONU 200-M are connected to the virtual OLT device 300 via optical transmission paths including an optical fiber FB and an optical splitter SP 50-1. The PON including the ONU 200-1, . . . , ONU 200-M and the virtual OLT device 300 is referred to as the first PON.

The ONU 200-M+1, . . . , ONU 200-N are connected to the virtual OLT device 300 via optical transmission paths including an optical fiber FB and an optical splitter SP 50-2. The PON including the ONU 200-M+1, . . . , ONU 200-N and the virtual OLT device 300 is referred to as the second PON.

Hereinafter, an arbitrary ONU among the ONU 200-1, . . . , ONU 200-M, ONU 200-M+1, ONU 200-N will be referred to as the ONU 200.

The virtual OLT 300, by means of a GATE frame, provides instructions regarding transmission starting times and transmission amounts so as to allow each of the multiple ONUs 200 to transmit signals without colliding in time. Meanwhile, the ONU 200, by means of a REPORT frame, notifies the virtual OLT 300 of the amount of data that has accumulated in a buffer in the ONU 200 and that is awaiting transmission.

(Virtual Subscriber Line Terminal Device (Virtual OLT Device))

The virtual OLT device 300 comprises hardware 310 and a software component 320. The software component 320 comprises a bandwidth allocation component 330, and the bandwidth allocation component 330 comprises an individual unit 341-1, an individual unit 341-2, an API 342 and a common unit 343.

The individual unit 341-1, based on an algorithm for allocating bands, acquires a bandwidth that is to be allocated to the ONU 200 that transmitted the bandwidth allocation request among the ONU 200-1 to the ONU 200-M included in the first PON. The individual unit 341-1 has an algorithm that is isolated from the common behavior of time-critical functions, and that allocates bands to the respective ONUs. This algorithm may be different from or the same as an algorithm in the individual unit 341-2. Time-critical functions and the common behavior of time-critical functions are as mentioned above.

The individual unit 341-1 acquires the bandwidth allocation request output by the common unit 343 to be described below, and based on the acquired bandwidth allocation request, computes a bandwidth to be allocated to the ONU 200 that transmitted the allocation request. The individual unit 341-1 outputs information indicating the computed bandwidth that is to be allocated to the ONU 200, through the API 342 to the common unit 343.

The individual unit 341-2, based on an algorithm for allocating bands, acquires a bandwidth that is to be allocated to the ONU 200 that transmitted the bandwidth allocation request among the ONU 200-M+1 to the ONU 200-N included in the second PON. The individual unit 341-2 has an algorithm that is isolated from the common behavior of time-critical functions, and that allocates bands to the respective ONUs. Time-critical functions and the common behavior of time-critical functions are as mentioned above.

The individual unit 341-2 acquires the bandwidth allocation request output by the common unit 343 to be described below, and based on the acquired bandwidth allocation request, computes a bandwidth to be allocated to the ONU 200 that transmitted the allocation request. The individual unit 341-2 outputs information indicating the computed bandwidth that is to be allocated to the ONU 200, through the API 342 to the common unit 343.

The common unit 343 acquires the bandwidth allocation request output by the communication unit and message-converts the acquired bandwidth allocation request to a message format that is used by the individual unit 341-1 or the individual unit 341-2. The common unit 343 outputs the message-converted bandwidth allocation request through the API 342 to the individual unit 341-1 or the individual unit 341-2.

The common unit 343 acquires the information indicating the bandwidth that is to be allocated to the ONU 200 output by the individual unit 341-1 or the individual unit 341-2 and decodes the acquired information indicating the bandwidth that is to be allocated to the ONU 200. The common unit 343 message-converts the results of the decoding of the information indicating the bandwidth that is to be allocated to the ONU 200 to a message format that is used by the hardware 310. The common unit 343 outputs, to the communication unit, the message-converted information indicating the bandwidth that is to be allocated to the ONU 200.

Specifically, the common unit 343 acquires the bandwidth allocation request output by the communication unit. If the acquired bandwidth allocation request has been transmitted by one of the ONU 200-1 to the ONU 200-M, the common unit 343 message-converts the acquired bandwidth allocation request to a message format that is used by the individual unit 341-1. The common unit 343 outputs the message-converted bandwidth allocation request through the API 342 to the individual unit 341-1. The common unit 343 acquires the information indicating the bandwidth that is to be allocated to the ONU 200 output by the individual unit 341-1 and decodes the acquired information indicating the bandwidth that is to be allocated to the ONU 200. The common unit 343 message-converts the decoded information indicating the bandwidth that is to be allocated to the ONU 200 to a message format that is used by the hardware 310. The common unit 343 outputs, to the communication unit, the message-converted information indicating the bandwidth that is to be allocated to the ONU 200.

Additionally, if the acquired bandwidth allocation request has been transmitted by one of the ONU 200-M+1 to the ONU 200-N, the common unit 343 message-converts the acquired bandwidth allocation request to a message format that is used by the individual unit 341-2. The common unit 343 outputs the message-converted bandwidth allocation request through the API 342 to the individual unit 341-2. The common unit 343 acquires the information indicating the bandwidth that is to be allocated to the ONU 200 output by the individual unit 341-2 and decodes the acquired information indicating the bandwidth that is to be allocated to the ONU 200. The common unit 343 message-converts the decoded information indicating the bandwidth that is to be allocated to the ONU 200 to a message format that is used by the hardware 310. The common unit 343 outputs, to the communication unit, the message-converted information indicating the bandwidth that is to be allocated to the ONU 200.

One example of a virtual OLT device 300 comprises a CPU, memory, auxiliary storage devices and the like that are connected by a bus, and functions as a device comprising a bandwidth allocation component 330 by executing a bandwidth allocation program. All or some of the functions of the bandwidth allocation component 330 may be realized by using hardware such as an ASIC, a PLD or an FPGA. The bandwidth allocation program may be recorded in a computer-readable recording medium. A computer-readable recording medium is, for example, a portable medium such as a flexible disk, a magneto-optic disk, a ROM or a CD-ROM, or a storage device such as an internal hard disk in a computer system. The bandwidth allocation program may also be transmitted via an electrical communication line.

Figure 4:
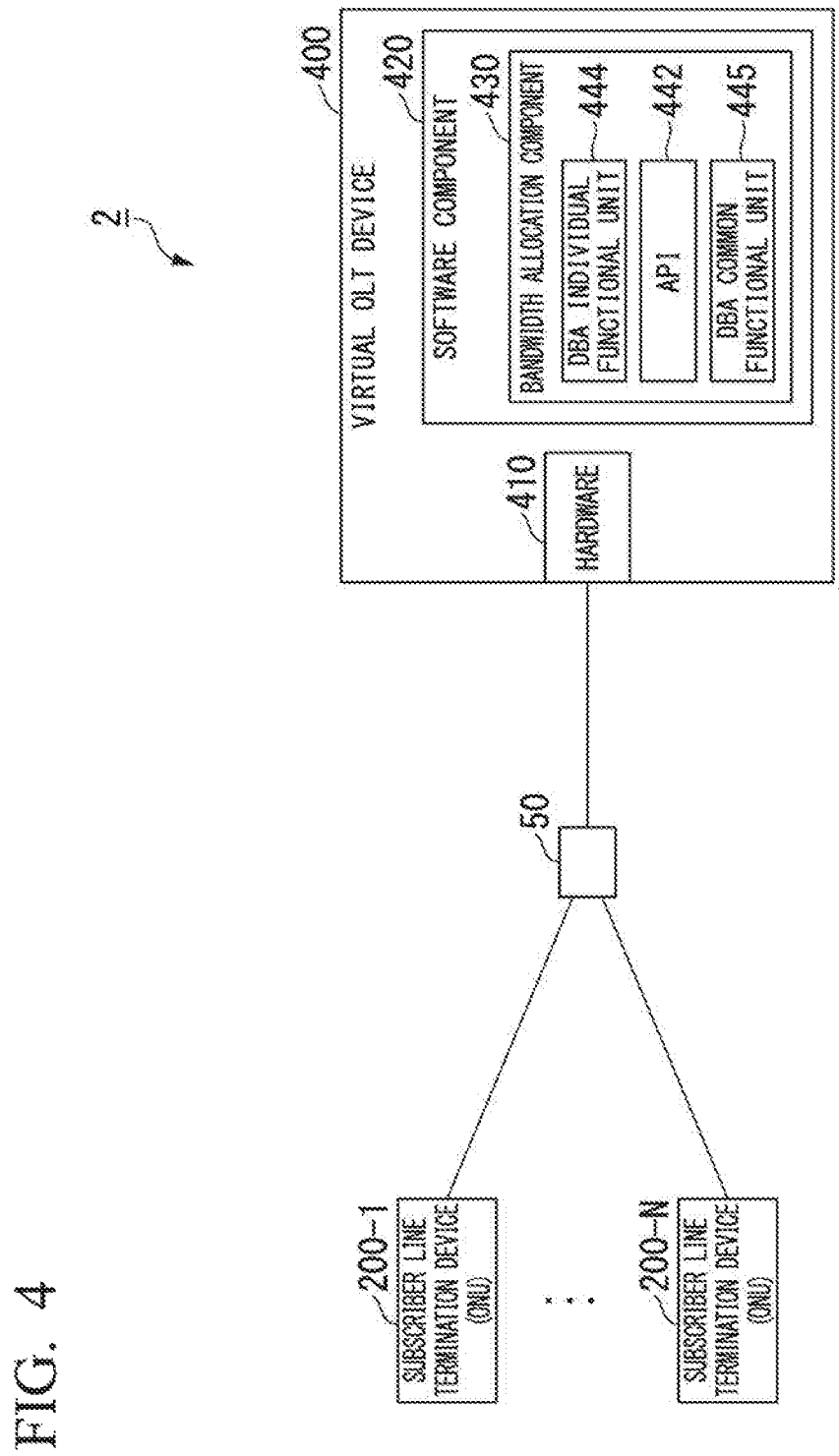
FIG. 4 is a diagram illustrating an example (3) of an optical communication system according to the first embodiment.

FIG. 4 is a diagram illustrating an example (3) of an optical communication system according to the first embodiment. In FIG. 4, the OLT is omitted. In the example illustrated in FIG. 4, a DBA is applied as the optical communication system explained with reference to FIG. 1. In this case, the DBA is a function for dynamically allocating uplink bands for communication from the ONUs to the OLT in accordance with traffic amounts.

One example of the optical communication system 2 comprises a virtual OLT device 400, and an ONU 200-1, . . . , an ONU 200-N.

(Virtual OLT Device)

The virtual OLT device 400 comprises hardware 410 and a software component 420. The software component 420 comprises a bandwidth allocation component 430, and the bandwidth allocation component 430 comprises a DBA individual functional unit 444, an API 442 and a DBA common functional unit 445.

The DBA individual functional unit 444, based on a DBA algorithm, acquires a bandwidth that is to be allocated to the ONU 200 that transmitted the bandwidth allocation request among the ONU 200-1 to the ONU 200-N. The DBA individual functional unit 444 has a DBA algorithm that is isolated from the common behavior of time-critical functions, and that allocates bands to the respective ONUs. Time-critical functions and the common behavior of time-critical functions are as mentioned above.

The DBA individual functional unit 444 acquires the bandwidth allocation request output by the DBA common functional unit 445 to be described below, and based on the acquired bandwidth allocation request, computes a bandwidth to be allocated to the ONU 200 that transmitted the allocation request. The DBA individual functional unit 444 outputs information indicating the computed bandwidth that is to be allocated to the ONU 200, through the API 442 to the DBA common functional unit 445.

The DBA common functional unit 445 acquires the bandwidth allocation request output by the communication unit and message-converts the acquired bandwidth allocation request to a message format that is used by the DBA individual functional unit 444. The DBA common functional unit 445 outputs the message-converted bandwidth allocation request through the API 442 to the DBA individual functional unit 444.

The DBA common functional unit 445 acquires the information indicating the bandwidth that is to be allocated to the ONU 200 output by the DBA individual functional unit 444 and decodes the acquired information indicating the bandwidth that is to be allocated to the ONU 200. The DBA common functional unit 445 message-converts the results of the decoding of the information indicating the bandwidth that is to be allocated to the ONU 200 to a message format that is used by the hardware 410. The DBA common functional unit 445 outputs, to the communication unit, the message-converted information indicating the bandwidth that is to be allocated to the ONU 200.

The API 442 is an interface between the DBA individual functional unit 444 and the DBA common functional unit 445. In other words, the API 442 is an interface that is used by the DBA individual functional unit 444 and the DBA common functional unit 445 in order to exchange information.

The optical communication system in FIG. 4 may also be applied to the case in which a DBA is applied to the optical communication system explained with reference to FIG. 3.

In the aforementioned embodiment, as one example of software, a case in which software functioning as a bandwidth allocation component 330 was added was explained, but this example is not limiting. For example, the embodiment is also applicable to a case in which software such as an application that functions as a component having a function other than that of a bandwidth allocation component 330 is added.

According to the optical communication system in this embodiment, a DBA application, which is a functional unit for realizing a virtual OLT device, is formed by means of the bandwidth allocation component 330 including a common unit 343, an individual unit 341, and an API 342 that is an interface between the common unit 343 and the individual unit 341. The common unit 343 performs a message conversion process for bridging the bandwidth allocation process with the individual unit 341. The individual unit 341 performs calculations for the bandwidth allocation algorithm.

Thus, in the present embodiment, it is separated into the individual unit 341 and the common unit 343. Due to such a structure, even if multiple DBA applications are of different types, the common unit 343 can absorb those differences. For example, even if there is a mix of different types of DBA applications, the common unit 343 can message-convert the information to messages suitable for the algorithms specific to each different type of DBA application. For this reason, it is possible to resolve timing mismatches or the like that might occur between different types of DBAs. As a result thereof, it is possible to reduce delays in the virtual OLT device.

Additionally, in the present embodiment, the algorithms for allocating bands to the respective ONUs are isolated from the common behavior of time-critical functions. As a result thereof, the individual unit 341 can, for example, acquire the bands of multiple ONUs in parallel, in accordance with multiple CPU cores. In other words, the algorithms for allocating bands can acquire bands to be allocated to each of different ONUs in parallel. For this reason, the time required for the bandwidth allocation process can be shortened.

Additionally, the common unit 343 performs common processes that are performed in common, regardless of the content of the algorithms for allocating bands. In other words, the processes in the common unit 343 are processes that do not tend to change with updates to the algorithms. For this reason, the processes in the common unit 343 can be considered to be processes in which fluctuation does not tend to occur. Due to the low-fluctuation processing time in the common unit 343, it is possible to clearly define the range of fluctuation in the processing times allowed in the individual unit 341 when there is a demand for low-delay conditions in a PON system. As a result thereof, it is possible to flexibly update the algorithms within the range of fluctuation allowed in the individual unit 341. In other words, it becomes possible to maintain low delays while retaining flexible compatibility based on the updating of software.

The case in which there is a demand to implement bandwidth allocation each millisecond will be explained. For example, it is estimated that the processing in the common unit 343 will be completed in approximately 30 µs. In this case, the demand can be satisfied if the fluctuation in the processing in the individual unit 341 is held to within the range from 300 to 800 µs. As a result thereof, the algorithm (software) can be flexibly updated within a fluctuation range of 300 to 800 µs.

Additionally, the processing time can be shortened by optimizing the common processes in the common unit 343 that are performed regardless of the algorithm. As a result thereof, it is possible to reduce delays.

Additionally, even if different algorithms are applied, it is sufficient to newly prepare an individual unit 341 or a DBA individual functional unit 444. For this reason, when newly applying an algorithm, it is possible to increase the flexibility for the case in which the algorithm is newly introduced in comparison to the case in which hardware is newly prepared.

In the present embodiment, the bandwidth allocation component 330 and the bandwidth allocation component 430 are formed by means of software. Additionally, in the present embodiment, processes for reducing delays is implemented in the bandwidth allocation requests acquired by the bandwidth allocation component 330 and the bandwidth allocation component 430. Even in such cases, the common unit 343 or the DBA common functional unit 445 can message-convert the acquired bandwidth allocation requests to message formats that are used in the individual unit 341 and the DBA individual functional unit 444.

Modified Example (1) of First Embodiment

As the optical communication system according to the modified example of the first embodiment, it is possible to apply the system in FIG. 1. In the optical communication system according to the modified example, the processing in the common unit 343 of the virtual OLT device 300 is different from that of the virtual OLT device 300 according to the aforementioned first embodiment.

The common unit 343 in the virtual OLT device 300 according to the modified example acquires a bandwidth allocation request output by the communication unit and outputs the acquired bandwidth allocation request through the API 342 to the individual unit 341 without message conversion. Specifically, the common unit 343 acquires data, such as a message, output by the communication unit. The common unit 343 outputs the acquired message through the API 342 to the individual unit 341 without message conversion. The message that is output to the individual unit 341 without message conversion includes information regarding a bandwidth for information or the like regarding the amount of data that has accumulated in a buffer such as BufOcc and that is awaiting transmission. For example, a data format complying with a standard is applied to the message in the modified example.

The common unit 343 acquires information indicating a bandwidth that is to be allocated to the ONU 200, output by the individual unit 341, and outputs the acquired information indicating the bandwidth that is to be allocated to the ONU 200 to the communication unit.

In the virtual OLT device 300, data processing delays lead to processing delays in the virtual OLT device 300 overall. For this reason, if the common unit 343 message-converts bandwidth allocation requests or messages by using a special method, it becomes necessary for the individual unit 341 to decode the bandwidth allocation requests or messages output by the common unit 343.

According to the virtual OLT device 300 in this modified example, it is possible to eliminate the time required for the message conversion process and the decoding process. For example, in the virtual OLT device 300 according to the modified example, messages in a data format that comply with a standard are used, so the message conversion and decoding can be eliminated. As a result thereof, processing delays in the virtual OLT device 300 overall can be reduced.

Modified Example (2) of First Embodiment

As the optical communication system according to the modified example of the first embodiment, it is possible to apply the system in FIG. 1. The optical communication system according to the modified example differs in that the processing in the common unit 343 in the virtual OLT device 300 is different from that in the virtual OLT device 300 according to the aforementioned first embodiment.

The common unit 343 in the virtual OLT device 300 according to the modified example outputs information regarding a band, such as BWmap, output by the individual unit 341, through the communication unit without message conversion. The message output to the common unit 343 without message conversion includes information regarding the band, such as BWmap. For example, a data format complying with a standard is applied to the message in the modified example.

The common unit 343 acquires information indicating a bandwidth that is to be allocated to the ONU 200, output by the individual unit 341, and outputs the acquired information indicating the bandwidth that is to be allocated to the ONU 200 to the communication unit.

In the virtual OLT device 300, data processing delays lead to processing delays in the virtual OLT device 300 overall. For this reason, if the individual unit 341 message-converts bandwidth allocation requests or messages by using a special method, it becomes necessary for the common unit 343 to decode the information indicating the bandwidth to be allocated to the ONU 200, output by the individual unit 341.

According to the virtual OLT device 300 in this modified example, it is possible to eliminate the time required for the message conversion process and the decoding process. For example, in the virtual OLT device 300 according to the modified example, messages in a data format that comply with a standard are used, so the message conversion and decoding can be eliminated. As a result thereof, processing delays in the virtual OLT device 300 overall can be reduced.

Second Embodiment

Figure 5:
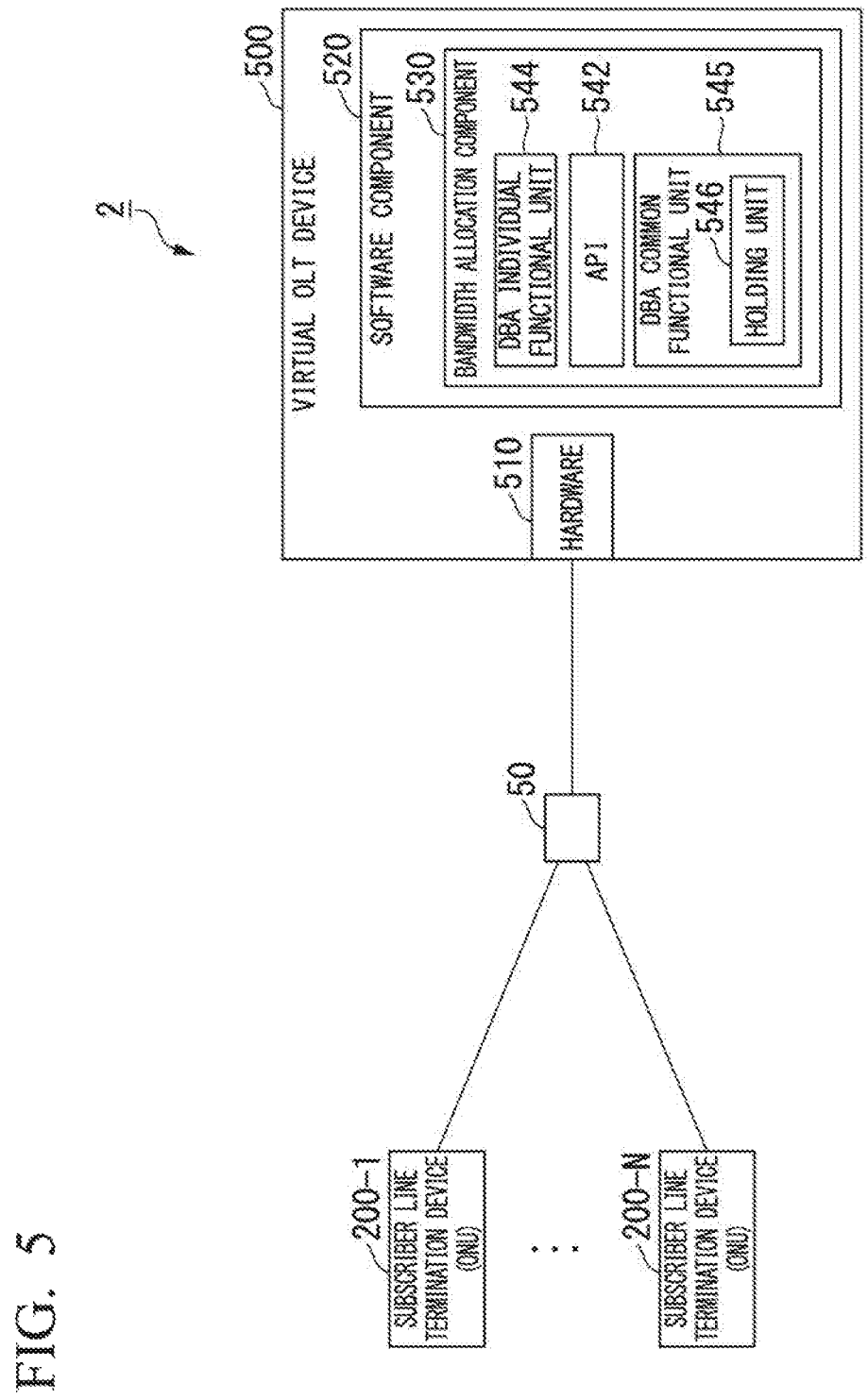
FIG. 5 is a diagram illustrating an example of an optical communication system according to a second embodiment.

FIG. 5 is a diagram illustrating an example of an optical communication system according to the second embodiment. The optical communication system 2 is a system for communicating by using optical signals. An example of the optical communication system 2 is a PON system, which comprises a virtual OLT device 500 and an ONU 200-1, . . . , an ONU 200-N. In FIG. 5, the OLT is omitted. The ONU 200 is connected to the virtual OLT device 500 via optical transmission paths including an optical fiber FB and an optical splitter SP 50. In the optical communication system 2, a DBA is applied.

As the information transmitted and received by the virtual OLT device 500 and the ONU 200, it is possible to apply the aforementioned first embodiment.

In the optical communication system according to the second embodiment, the algorithm in the bandwidth allocation component 530 can be updated by replacement with another algorithm. While the algorithm in the bandwidth allocation component 530 is being replaced with another algorithm, on the basis of a bandwidth allocation request, the process of computing the bandwidth to be allocated to the ONU 200 that transmitted that allocation request is suspended. At this time, due to the replacement of the algorithm, the bandwidth allocation requests and the statistical amounts of the bands allocated to each ONU 200 are lost. As a result thereof, imbalances occur in allocation of the bands to the respective ONUs 200.

For example, the case in which the algorithm is updated after a wide bandwidth has been allocated to a certain ONU 200 will be explained. When a wide bandwidth is allocated to a certain ONU 200, a wide bandwidth is also allocated, for example, to another ONU 200 in order to maintain balanced bandwidth allocation. However, due to the loss of the statistical amounts with the replacement of the algorithm, a wide bandwidth is not allocated to the other ONU 200. As a result thereof, it is difficult to equalize allocation of the bands among the multiple ONUs 200.

For this reason, the optical communication system according to the second embodiment accumulates and holds the statistical amounts of bands allocated to the respective ONUs 200, the bandwidth allocation requests and the like while the algorithm in the bandwidth allocation component 530 is being replaced by another algorithm.

(Virtual OLT Device)

The virtual OLT device 500 comprises hardware 510 and a software component 520. The software component 520 comprises a bandwidth allocation component 530. The bandwidth allocation component 530 comprises a DBA individual functional unit 544, an API 542, a DBA common functional unit 545 and a holding unit 546.

As the hardware 510, the software component 520, the bandwidth allocation component 530, the DBA individual functional unit 544, the API 542 and the DBA common functional unit 545, it is possible to apply the hardware 410, the software component 420, the bandwidth allocation component 430, the DBA individual functional unit 444, the API 442 and the DBA common functional unit 445 in the virtual OLT device 400 according to the aforementioned first embodiment. However, in the DBA individual functional unit 544, the algorithm is updated by replacement with another algorithm.

The holding unit 546 holds information acquired by the DBA common functional unit 545 while the DBA individual functional unit 544 is performing the process for replacement with another algorithm. When the replacement process has ended, the holding unit 546 outputs the held information through the API 542 to the DBA individual functional unit 544. The holding unit 546 may hold information that has not yet been message-converted, or may hold information that has been message-converted. Additionally, the information held by the holding unit 546 includes bandwidth allocation requests and messages such as information regarding the amount of data that has accumulated in the buffer and that is awaiting transmission, output by the communication unit, and information regarding the band, such as BWmap. Thus, the information held in the holding unit 546 includes the statistical amounts of bands allocated to each ONU 200 in the past. Thus, the holding unit 546 holds the data acquired by the DBA common functional unit 545 while the replacement process is being performed.

One example of a virtual OLT device 500 comprises a CPU, memory, auxiliary storage devices and the like that are connected by a bus, and functions as a device comprising a bandwidth allocation component 530 by executing a bandwidth allocation program. All or some of the functions of the bandwidth allocation component 530 may be realized by using hardware such as an ASIC, a PLD or an FPGA. The bandwidth allocation program may be recorded in a computer-readable recording medium. A computer-readable recording medium is, for example, a portable medium such as a flexible disk, a magneto-optic disk, a ROM or a CD-ROM, or a storage device such as an internal hard disk in a computer system. The bandwidth allocation program may also be transmitted via an electrical communication line.

According to the optical communication system in the present embodiment, the algorithm in the bandwidth allocation component 530 can be updated by replacement with another algorithm. As a result thereof, in the virtual OLT device, it is possible to ensure the flexibility to change the DBA algorithm for fair allocation or prioritized allocation or the like.

Additionally, while replacing the algorithm in the bandwidth allocation component 530 with another algorithm, the holding unit 546 holds bandwidth allocation requests output by the communication unit, the statistical amounts of bands allocated to each ONU 200 in the past, and the like.

The bandwidth allocation component 530 in the second embodiment can allocate bands based on the latest bandwidth allocation request held in the holding unit 546, and on the acquisition of statistical amounts. As a result thereof, the bandwidth allocation component 530 can fairly allocate bands to the respective ONUs 200. In other words, the processing in the communication unit is not affected by the replacement of the algorithm. By configuring the invention in this way, it is possible to replace the algorithm in the bandwidth allocation component 530 with another algorithm without affecting the processing in the communication unit.

Additionally, bandwidth allocation requests and the like output by the communication unit are held. As a result thereof, after the replacement process has ended, there is no need to newly reacquire, from the ONUs 200, bandwidth allocation requests, information regarding the bands that have been allocated in the past and the like. As a result thereof, processing delays of bandwidth allocation requests can be reduced in comparison to the case in which they are retransmitted by the ONUs 200. Additionally, management information such as the connection states and authentication states of the ONUs 200 are held in the holding unit 546. As a result thereof, it is possible to eliminate processing delays due to reconnection registration and authentication when the algorithm is replaced.

Modified Example (1) of Second Embodiment

Figure 6:
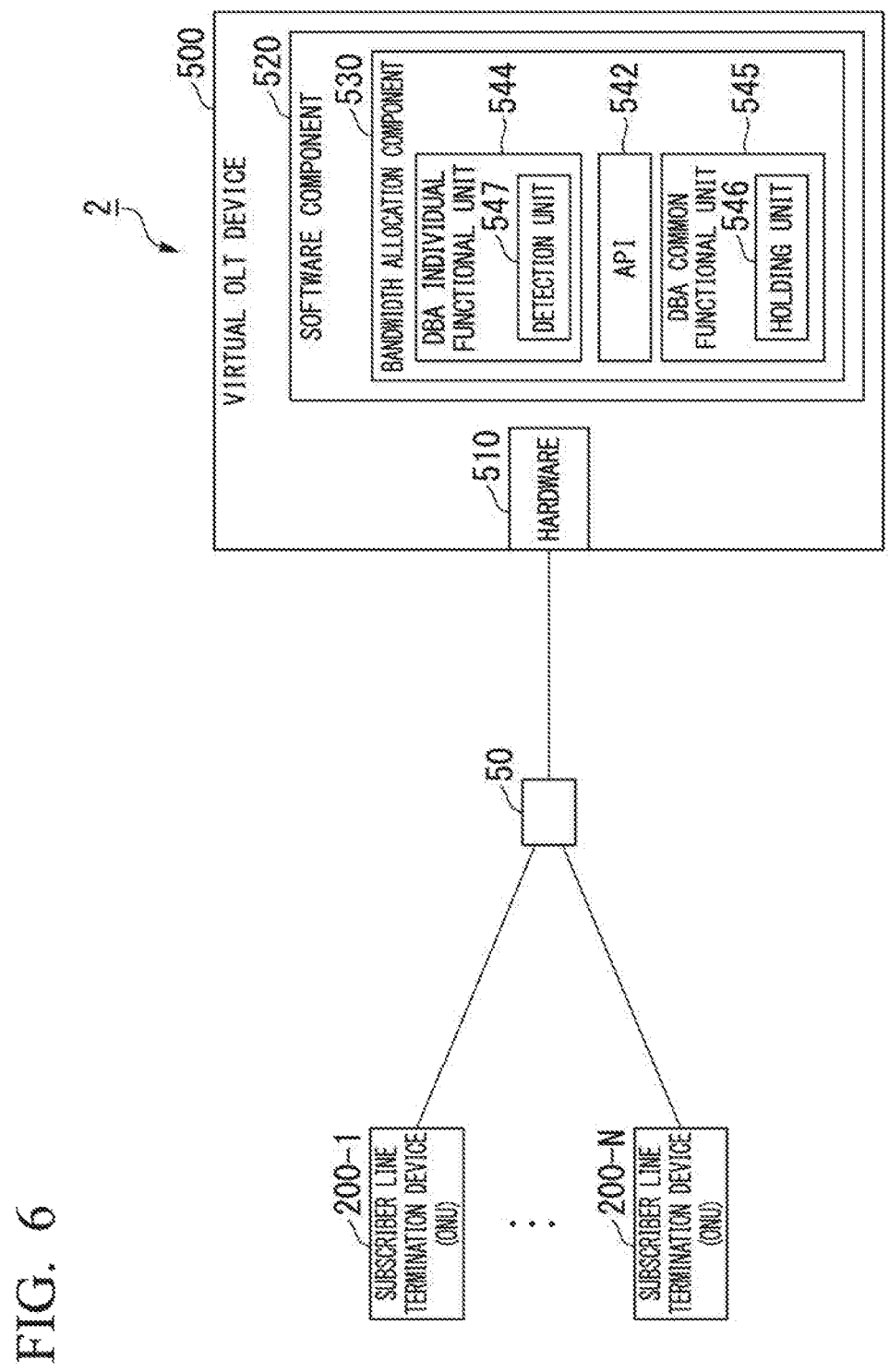
FIG. 6 is a diagram illustrating an example (1) of a communication system according to a modified example of the second embodiment.

FIG. 6 is a diagram illustrating one example (1) of the communication system according to a modified example of the second embodiment. In FIG. 6, the OLT is omitted.

The optical communication system 2 according to this modified example differs from the communication system according to the aforementioned second embodiment in that a detection unit 547 is provided in the bandwidth allocation component 530.

The detection unit 547 detects that the process of replacing the DBA individual functional unit 544 with another algorithm has ended. Furthermore, the holding unit 546 outputs the held information to the DBA individual functional unit 544 when the detection unit 547 detects that the replacement process has ended.

According to the optical communication system in this modified example, the algorithm in the bandwidth allocation component 530 can be updated by replacement with another algorithm. As a result thereof, in the virtual OLT device, it is possible to ensure the flexibility to change the DBA algorithm for fair allocation or prioritized allocation or the like.

Additionally, while the algorithm in the bandwidth allocation component 530 is being replaced by the other algorithm, the holding unit 546 holds the bandwidth allocation requests output by the communication unit, the statistical amounts of bands allocated to the respective ONUs 200, and the like. As a result thereof, it is possible to replace the algorithm in the bandwidth allocation component 530 with another algorithm without affecting the processing in the communication unit. The connection between the DBA individual functional unit 544 and the functional units other than the DBA individual functional unit 544 in the virtual OLT device 500 is weak. As a result thereof, even if the algorithm in the DBA individual functional unit 544 is dynamically replaced, the functional units other than the DBA specific functional unit 544 are only slightly affected.

Additionally, there is a risk that information acquired during replacement of the algorithm will be discarded. In the present embodiment, after the detection unit 547 detects that the replacement process has ended, the bandwidth allocation requests, statistical amounts of bands allocated to the respective ONUs 200 and the like held in the holding unit 546 are output to the DBA individual functional unit 544. As a result thereof, it is possible to replace the algorithm in the bandwidth allocation component 530 with another algorithm without affecting the processing in the communication unit. In other words, the algorithm can be replaced without causing an imbalance in the allocation of bands to the ONUs 200. Additionally, the holding unit 546 holds the bandwidth allocation requests and the like output by the communication unit. As a result thereof, it is possible to reduce processing delays of the bandwidth allocation requests in comparison to the case in which the bandwidth allocation requests and the like are newly transmitted after the replacement process has ended.

Thus, the holding unit 546 holds the data acquired by the DBA common functional unit 545 while the replacement process is being performed. When the detection unit 547 detects that the replacement process has ended, the held data is output to the DBA individual functional unit 544 in addition to the bandwidth allocation requests.

Modified Example (2) of Second Embodiment

Figure 7:
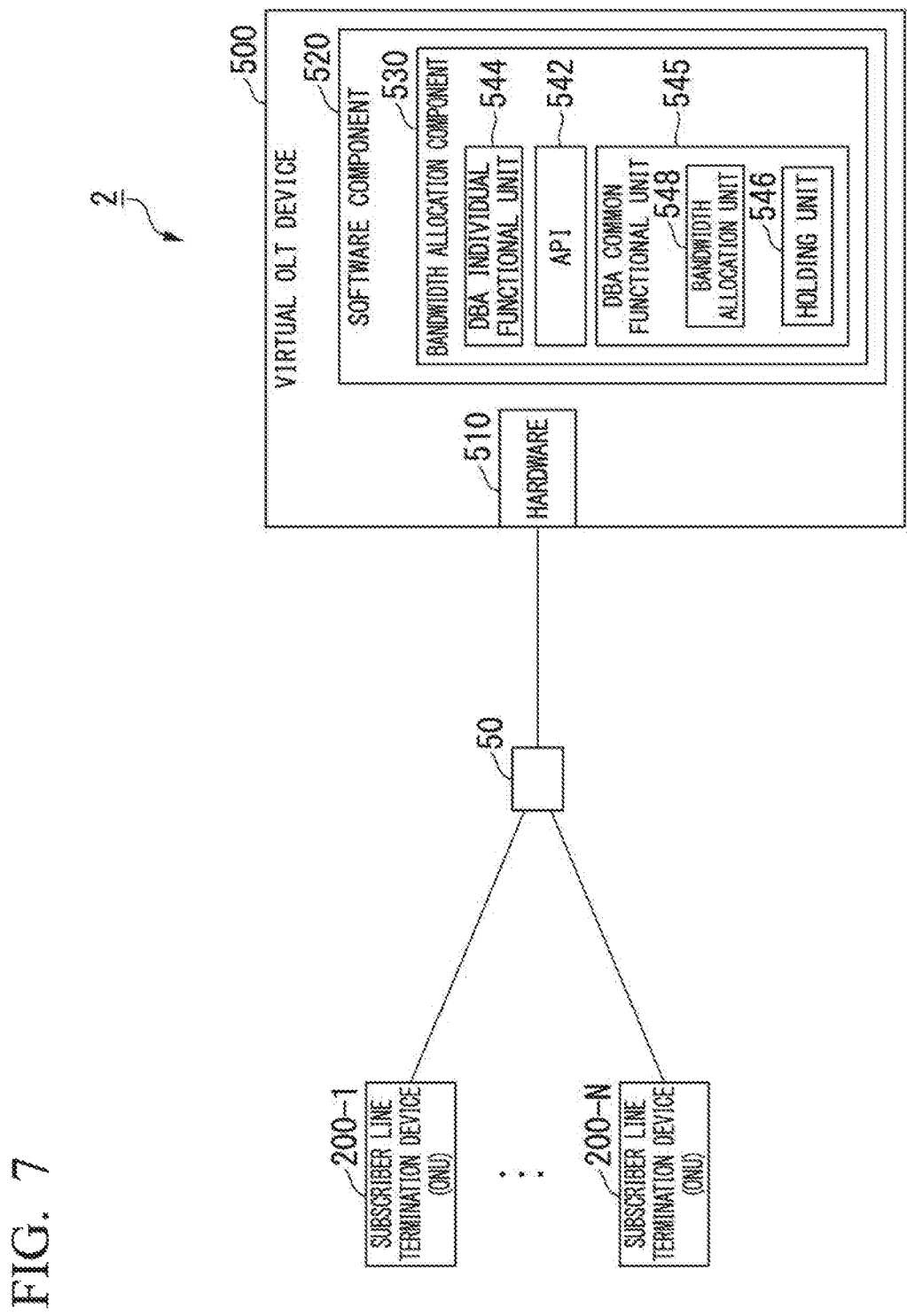
FIG. 7 is a diagram illustrating an example (2) of a communication system according to a modified example of the second embodiment.

FIG. 7 is a diagram illustrating one example (2) of the communication system according to a modified example of the second embodiment.

The optical communication system 2 according to this modified example differs from the communication system according to the aforementioned second embodiment in that a bandwidth allocation unit 548 is provided in the bandwidth allocation component 530.

While the algorithm in the DBA individual functional unit 544 is being replaced with another algorithm, the holding unit 546 holds information indicating the bandwidth to be allocated to the ONU 200 output by the DBA individual functional unit 544, acquired by the DBA common functional unit 545. The bandwidth allocation unit 548 allocates a bandwidth based on the information, in the holding unit 546, indicating the bandwidth to be allocated to the ONU 200, even while the algorithm in the DBA individual functional unit 544 is being replaced with another algorithm. In other words, the bandwidth allocation unit 548 message-converts the acquired information indicating the bandwidth to be allocated to the ONU 200 to the message format used in the hardware 510. The DBA common functional unit 545 outputs, to the communication unit, the message-converted information indicating the bandwidth to be allocated to the ONU 200.

According to the optical communication system in this modified example, the bandwidth allocation unit 548 continues the process of allocating bands to the ONU 200 even while the holding unit 546 holds information acquired by the DBA common functional unit 545. By configuring the invention in this way, bands are not allocated to the ONU 200 while information acquired by the DBA common functional unit 545 is being held, thereby allowing transmission data (uplink data) to continue to be held in the ONU 2000 and allowing increased delays to be suppressed.

While embodiments of the present invention have been explained in detail with reference to the drawings, the specific configuration need not be limited to these embodiments, and designs and the like within a range not departing from the gist of the present invention are also included.

INDUSTRIAL APPLICABILITY

According to the present invention, it is possible to provide a virtual subscriber line terminal station device that is able to ensure compatibility of bandwidth allocation components for allocating bands to subscriber line termination devices.

| Reference Symbols | |
|---|---|
| 1, 2 | Optical communication system |
| 50, 50-1, 50-2 | Optical splitter |
| 100 | Subscriber line terminal station device |
| 200, 200-1, 200-2, . . . 200-N | Subscriber line termination device |
| 300, 400, 500 | Virtual OLT device |
| 310, 410, 510 | Hardware |
| 320, 420, 520 | Software component |
| 330, 430, 530 | Bandwidth allocation component |
| 341, 341-1, 341-2 | Individual unit |
| 342, 442 | API |
| 343 | Common unit |
| 444, 544 | DBA individual functional unit |
| 445, 545 | DBA common functional unit |
| 546 | Holding unit |
| 547 | Detection unit |
| 548 | Bandwidth allocation unit |

The invention claimed is:

1. A virtual subscriber line terminal station device comprising:
a software component including software to be added in accordance with a service requirement; and
hardware having general-purpose functions, wherein:
the hardware includes a communication unit that receives bandwidth allocation requests transmitted by a plurality of subscriber line termination devices; and
the software component includes a bandwidth allocation component that allocates a bandwidth to each of the plurality of subscriber line termination devices based on the bandwidth allocation requests received by the communication unit, and wherein
the bandwidth allocation component comprises:
an individual unit that, based on an algorithm for allocating bands, computes in parallel the bandwidth to be allocated to each of the plurality of subscriber line termination devices that transmitted the bandwidth allocation request;
a common unit that has low fluctuation in processing time than the individual unit and allocates the bandwidth to the each of the plurality of subscriber line termination devices in accordance with the bandwidth allocated by the individual unit; and
an interface between the individual unit and the common unit,
the common unit converting a bandwidth allocation request received by the communication unit to a format that can be used by the individual unit,
the individual unit computing the bandwidth to be allocated to the subscriber line termination device that transmitted the bandwidth allocation request that is converted, by the common unit, to a format that can be used by the individual unit.

2. The virtual subscriber line terminal station device according to claim 1, wherein:
the common unit outputs data received by the communication unit to the interface; and
the interface outputs the data output by the common unit to the individual unit.

3. The virtual subscriber line terminal station device according to claim 1, wherein:
the individual unit replaces the algorithm with another algorithm for allocating bands; and
the common unit comprises:
a holding unit that acquires the bandwidth allocation request and holds the bandwidth allocation request that is acquired by the common unit while a process for replacement with the another algorithm is being performed,
the holding unit outputs the held bandwidth allocation request to the individual unit when an ending of the process for replacement is detected.

4. The virtual subscriber line terminal station device according to claim 3, wherein:
the individual unit further comprises a detection unit that detects that the process for replacement of the another algorithm has ended; and
the holding unit outputs the bandwidth allocation request to the individual unit when the ending of the process for replacement is detected by the detection unit.

5. The virtual subscriber line terminal station device according to claim 4, wherein
the holding unit holds data acquired by the common unit while the process for replacement with the another algorithm is being performed, and outputs the data in addition to the bandwidth allocation request to the individual unit when the ending of the process for replacement is detected by the detection unit.

6. The virtual subscriber line terminal station device according to claim 3, wherein
the common unit further comprises a bandwidth allocation unit that allocates the bandwidth to the subscriber line termination device while the process for replacement with the another algorithm is being performed.

7. A control method for a virtual subscriber line terminal station device, the virtual subscriber line terminal station device comprising:
a software component including software to be added in accordance with a service requirement; and
hardware having general-purpose functions,
wherein the control method comprises:
receiving, by the hardware, bandwidth allocation requests transmitted by a plurality of subscriber line termination devices;
converting, by a common unit in the software component, the bandwidth allocation requests received by the hardware to a format that can be used by an individual unit in the software component;

computing in parallel, by the individual unit in the software component, based on an algorithm for allocating bands, a bandwidth to be allocated to each of the plurality of subscriber line termination devices that transmitted the bandwidth allocation request that is converted; and allocating, by the common unit having low fluctuation in processing time than the individual unit in the software component, in accordance with the bandwidth allocated by the individual unit, the bandwidth to each of the plurality of subscriber line termination devices.

8. A virtual subscriber line terminal station device comprising:

a software component including software to be added in accordance with a service requirement; and hardware having general-purpose functions, wherein:

the hardware includes a communication unit that receives bandwidth allocation requests transmitted by a plurality of subscriber line termination devices; and the software component includes a bandwidth allocation component that allocates a bandwidth to each of the plurality of subscriber line termination devices based on the bandwidth allocation requests received by the communication unit, and wherein the bandwidth allocation component comprises:

a first individual unit that, based on a first algorithm for allocating bands, computes a bandwidth to be allocated to a first subscriber line termination device that transmitted a first bandwidth allocation request;

a second individual unit that, based on a second algorithm for allocating bands which is different from the first algorithm, computes a bandwidth to be allocated to a second subscriber line termination device that transmitted a second bandwidth allocation request;

a common unit that perform common processes regardless of whether it is the first algorithm or the second algorithm, and allocates the bandwidth to the first subscriber line termination device and the second subscriber line termination device respectively, in accordance with the bandwidth allocated by the first individual unit and the second individual unit; and an interface between the common unit and each of the first individual unit and the second individual unit, the common unit converting the first bandwidth allocation request and the second bandwidth allocation request received by the communication unit to formats that can be used by the first individual unit and the second individual unit, respectively, the first individual unit computing the bandwidth to be allocated to the first subscriber line termination device that transmitted the first bandwidth allocation request converted by the common unit to a format that can be used by the first individual unit, and the second individual unit computing the bandwidth to be allocated to the second subscriber line termination device that transmitted the second bandwidth allocation request converted by the common unit to a format that can be used by the second individual unit.

9. A control method for a virtual subscriber line terminal station device, the virtual subscriber line terminal station device comprising:

a software component including software to be added in accordance with a service requirement; and hardware having general-purpose functions, wherein the control method comprises:

receiving, by the hardware, a bandwidth allocation request transmitted by a plurality of subscriber line termination devices;

converting, by a common unit in the software component, the bandwidth allocation request received by the hardware to a format that can be used by first individual unit or second individual unit in the software component;

computing, by the first individual unit in the software component, based on a first algorithm for allocating bands, a bandwidth to be allocated to the first subscriber line termination device that transmitted the first bandwidth allocation request that is converted;

computing, by the second individual unit in the software component, based on a second algorithm for allocating bands which is different from the first algorithm, a bandwidth to be allocated to the second subscriber line termination device that transmitted the second bandwidth allocation request that is converted; and allocating, by the common unit that perform common processes regardless of whether it is the first algorithm or the second algorithm in the software component, the bandwidth to the first subscriber line termination device and the second subscriber line termination device respectively, in accordance with the bandwidth allocated by the first individual unit and the second individual unit.

10. The virtual subscriber line terminal station device according to claim 1, wherein:

the low fluctuation indicates that a range of change in the processing time is low.

* * * * *